United States Patent [19]

Noiles

[11] 3,836,116

[45] Sept. 17, 1974

[54] SELF-ENERGIZING VALVE

[75] Inventor: Douglas G. Noiles, New Canaan, Conn.

[73] Assignee: United States Surgical Corporation, Baltimore, Md.

[22] Filed: Sept. 29, 1972

[21] Appl. No.: 293,371

[52] U.S. Cl................ 251/174, 91/398, 137/596.14
[51] Int. Cl............................................. F16k 21/00
[58] Field of Search............. 251/77, 174, 321, 322, 251/325; 137/596, 596.14

[56] References Cited
UNITED STATES PATENTS

| 2,724,408 | 11/1955 | Trevaskis et al................ | 251/321 X |
| 3,583,426 | 6/1971 | Feres.............................. | 251/174 X |
| 3,613,507 | 10/1971 | Smith, Jr................................. | 91/398 |

FOREIGN PATENTS OR APPLICATIONS

| 1,257,410 | 2/1961 | France................................. | 91/465 |
| 1,002,091 | 8/1965 | Great Britain................. | 137/596.14 |

Primary Examiner—Irwin C. Cohen
Attorney, Agent, or Firm—Fleit, Gipple & Jacobson

[57] ABSTRACT

A power pack for converting gas pressure into rectilinear movement of a drive shaft. The power pack is activated by unseating the primary spool of a spool mechanism from a self-energizing pilot valve releasing a volume of pressurized gas and thereby driving a shaft adapted to be associated with a mechanism requiring an input of rectilinear movement. The pilot valve body has a throughgoing bore and is adapted to be slideably seated in a valve housing. The pilot valve body is connected with a source of pressurized gas and is seated on a spring within the valve housing so that pressurized gas is discharged through the body bore when the spool mechanism is unseated from the pilot valve body.

4 Claims, 14 Drawing Figures

SELF-ENERGIZING VALVE

BACKGROUND OF THE INVENTION

The general concept of a gas powered driving unit as disclosed by the present invention is not new. See for example, U.S. Pat. No. 3,613,507, issued Oct. 19, 1971; and U.S. Pat. No. 3,618,842, issued Nov. 9, 1971 and U.S. Pat. No. 3,643,851, issued Feb. 22, 1972, all of which are assigned to the present Assignee. Additional prior art of interest can be found in the art cited by the Patent Office during the prosecution of the above-identified patents.

The power unit described in each of the above-noted patents functions capably. However, each of the above-mentioned power units suffers from certain disadvantages. For example, the power unit described in U.S. Pat. No. 3,613,507 has a small seal area which with repeated seatings may not insure contact with identical surfaces. Consequently, the sealing area increases because of plastic deformation and can ultimately create an area large enough for pressure forces to exceed spring forces in the other direction and hence could fail due to leakage.

In the power unit described in U.S. Pat. No. 3,618,842, the pressure chambers are defined by a series of O-rings which after long periods of wear may cause leakage between one chamber and the next.

In the third patent, U.S. Pat. No. 3,643,851, the gas chamber is defined by a plurality of sliding diaphragms. These diaphragms were found to be somewhat weak and, in time, often developed leaks.

It is towards the elimination of the above-noted disadvantages and the simplification of known power pack units that the present invention is directed.

SUMMARY OF THE INVENTION

The present invention relates to a power pack capable of converting gas pressure into rectilinear movement, using a minimum amount of pressurized gas and with a minimum of moving parts. Pressurized gas is fed into the inventive power pack and when the power pack is idle the spool mechanism of the power pack is sealed off from the gas pressure. The two-part movable spool mechanism is maintained in constant contact with the gas pressure through the action of a pilot valve which has a gas port through its center. The contact between the rear of the spool mechanism and the pilot valve seals off the pressurized gas with the flat surface of the outer end of the valve abutting the flat surface of the inlet valve body allowing the pilot valve to have random orientation contact without damaging the seal.

The power pack of the present invention is fired when the driving piston and integral drive shaft are moved against the force of the piston return biasing spring. This movement allows the spool mechanism to become unseated from the pilot valve and held in its unseated position through the action of pressurized gas acting upon the surfaces of the spool mechanism. When the spool is unseated the source of pressurized gas acts upon the piston integral with the drive shaft. The drive shaft is then driven by the pressurized gas through a firing cycle.

During movement of the return of the piston, the force on the face of the spool mechanism remote from the gas port becomes greater than the force on the face of the spool mechanism adjacent the gas port, so that the spool mechanism is driven toward the gas port seating it against the pilot valve to seal the source of gas pressure. When the drive shaft is returned by its biasing spring, the gas in the piston chamber is exhausted, and the piston is brought into contact with the spool mechanism. At this time the power unit is ready for another drive cycle.

The operation of the inventive power pack is dependent upon the self energizing seal of the pilot valve, and the two-part spool mechanism with its sealing O-rings. Furthermore, the total area of the pilot valve sealing surface is such that it cannot become enlarged enough to misfire as there is always a sealing contact between the flat surfaces of the valve lip and the flat end surface primary spool projecting tip allowing a random orientation contact of the pilot valve body without damaging the seal. In addition, the unit provides for a cushioning effect on its various component parts. The rearward thrust of the spool mechanism causing contact with the pilot valve body is cushioned by two independent forces. The first force, and the lesser of the two, originates in the pilot valve biasing spring which at all times urges the pilot valve toward spool mechanism and thus absorbs the contact force when the spool mechanism strikes the pilot valve body. The second force originates in the pressure of the inlet acting on the net cross sectional area of the pilot valve body.

Also, the forward unit of the drive shaft is against the biasing spring which at all times urges the drive shaft and integral piston toward the spool mechanism.

As constructed, the power pack forming the present invention has two major moving elements comprising a spool mechanism having two movable parts and a movable pilot valve body. The life of the power pack is substantial because of the minimal amount of wear on the apparatus so that it has great reliability for long periods of use. Furthermore, the apparatus also provides a means of transforming pressure forces into rectilinear motion in an efficient and reliable manner.

By utilizing the present invention, whose parts have tolerances that are relatively loose, the need for high precision machinery is eliminated as the manufacturing tolerances do not have to be so precise. Even without close tolerances of the parts as compared with similar units of the prior art, substantial thrust is able to be developed in the drive shaft with the effect that the moving parts are returned to their prefiring positions by combining the effects of the gas pressure and a single biasing spring.

Other features and advantages of the invention will be apparent from the following description of the embodiments of the invention as shown in the accompanying drawings.

DETAILED DESCRIPTION OF THE DRAWINGS

Figure 1:
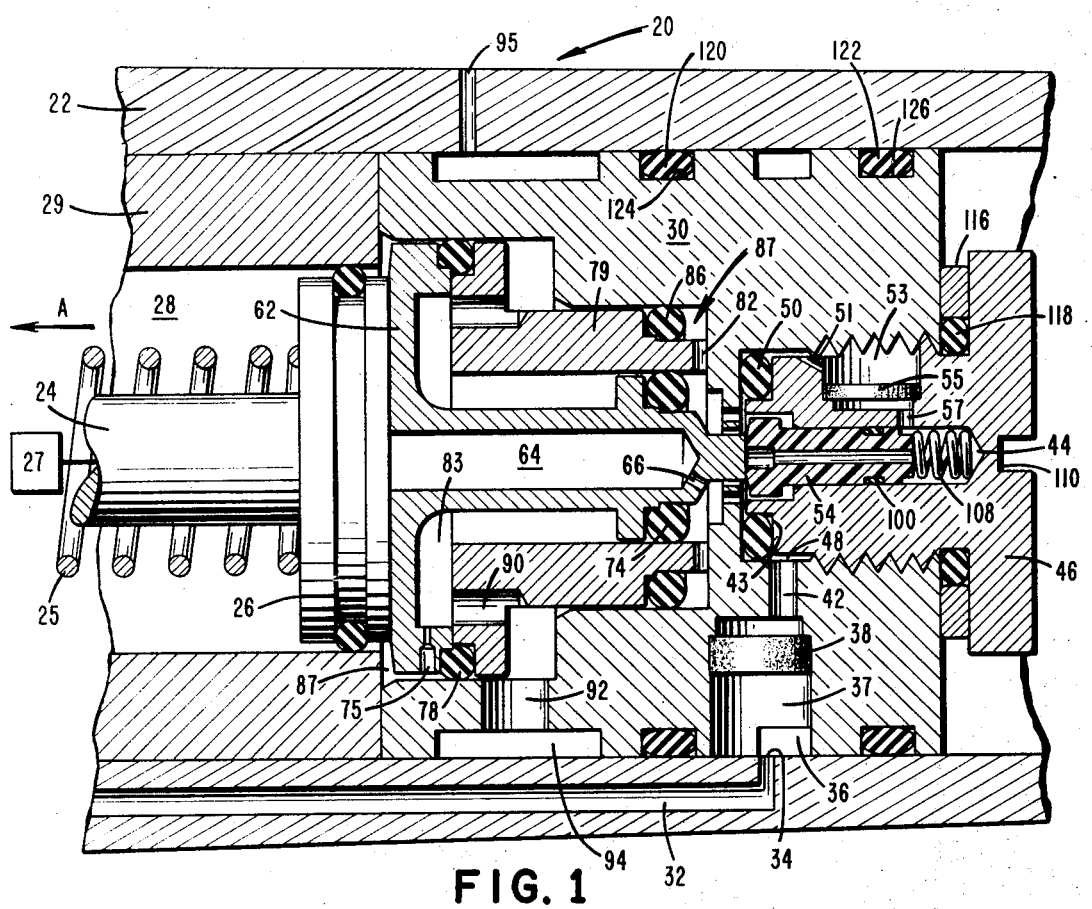
FIG. 1 is a partial cross section through a power pack constructed in accordance with the teachings of the present invention.

As shown in FIGS. 1–14 the inventive power pack generally discloses an outer casing 22 in which is mounted an inlet valve body 30 containing a primary spool body 62, a secondary spool body 79, a pilot housing 46 and a pilot valve body 54. A drive shaft 24 is slidably mounted in the outer casing with the foremost end of the drive shaft (not shown) being the output side of the power pack and serving to operate any device depending upon a rectilinear motion input for its performance.

The rearwardmost end of the drive shaft takes the form of a piston 26 slidably mounted in a piston chamber 28 defined by an inner casing member 29. The piston 26 is held in position by a piston return spring 25 which exerts a force on the piston 26 of approximately 11 to 12 pounds. The inner casing member 29 is mounted in a fixed position within the outer casing 22.

Figure 2:
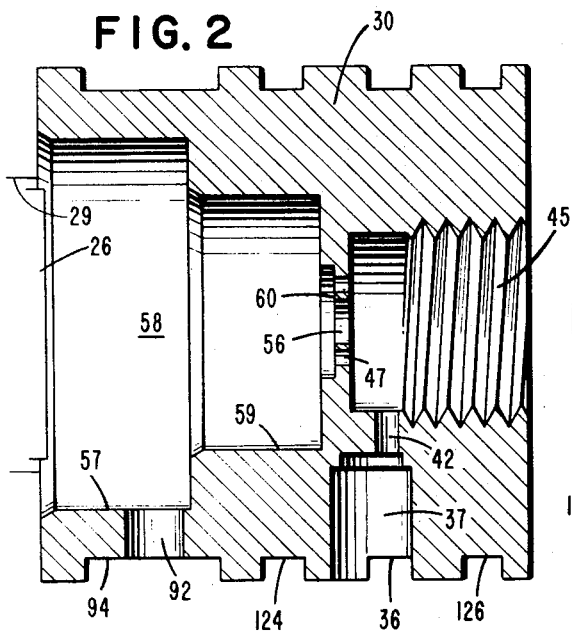
FIG. 2 is a cross section view of the inlet valve body shown in FIG. 1 in relation to the piston.
Figure 3:
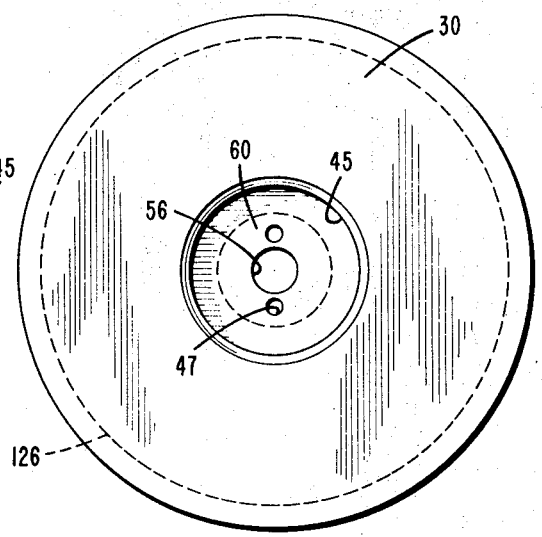
FIG. 3 is the right end elevation view of the inlet valve body of FIG. 2.

Mounted in the outer casing 22 adjacent the inner casing member 29 is an inlet valve body 30. The inlet valve body 30 as shown in FIGS. 2 and 3 defines two centrally located interconnected chambers; a stepped spool chamber 58 and a pilot housing chamber 45 which are interconnected by port 56 and vents 47. The stepped spool chamber 58 preferably comprises two sections or steps each of which has a different diameter, the larger section 57 being of sufficient diameter to hold the primary spool body 62, the other 59 being of sufficient diameter to hold the second spool body 79. The outer surface of the inlet valve body 30 defines a plurality of annular channels, 36, 94, 124 and 126. An exhaust port 92 is cut through the inlet valve body 30 to connect chamber section 57 with an annular exhaust cahnnel or ring 94. The inlet valve body also defines a filter chamber 37 which is connected to the pilot housing chamber 45 by inlet passageway 42.

Figure 9:
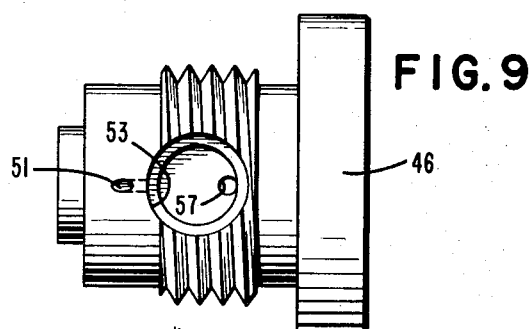
FIG. 9 is plan view of the pilot plug housing shown in FIG. 8.
Figure 8:
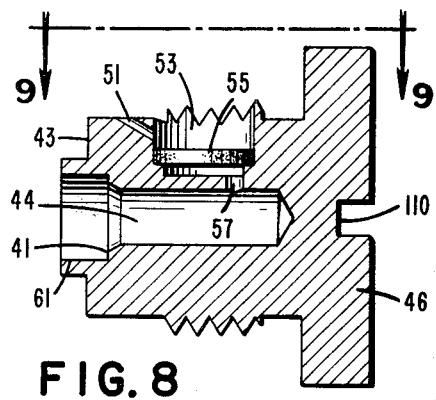
FIG. 8 is a cross section view of the pilot plug housing shown in FIG. 1.
Figure 10:
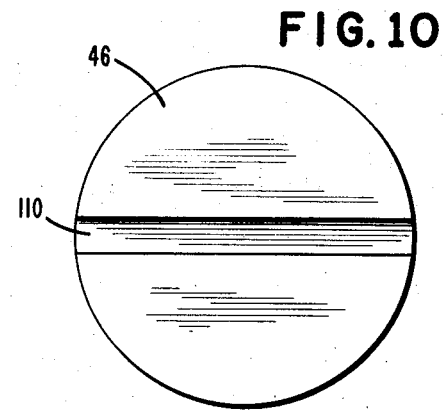
FIG. 10 is the right end elevation view of the pilot plug housing of FIG. 8.

A stainless steel capillary tubing 32 leads from the gas pressure source (not shown) through the outer casing 22 into the gas feed channel 36 of the inlet valve body so that the source of pressurized gas can operate the working mechanism of the power pack 20. The pressurized gas enters channel 36 from the capillary tubing 32 at 34 and travels into the inlet valve body filter chamber 37. The gas is filtered by filter 38 on its way into passageway 42 which communicates with annulus 48 in housing chamber 45. The annulus 48 is defined by the inlet valve body 30, the outer surface of the pilot housing 46 and O-ring 50 seated inside the housing chamber 45 and abutting the housing body shoulders 43. The pilot housing 46 as shown in FIGS. 1, 8 and 9, is preferably threaded so that it can be screwed into the inlet valve body 30 by means of a slot 110. A blind hole is drilled in the pilot housing to form the pilot valve chamber 44. The blind end of chamber 44 is used as a spring seat 104 for the pilot valve biasing spring 108. The chamber 44 is preferably stepped to allow clearance for shoulder 103 on pilot valve body 54. A filter chamber 53 holds filter 55. The filter chamber 53 communicates with the pilot chamber 44 by means of a port 57 cut through the pilot housing 46. Filter chamber 53 also communicates with feed chamber 48 by passageway 51. A pilot valve body 54 is slidably fitted into pilot housing chamber 44 in a gas tight relationship by means of O-ring 100.

Figure 12:
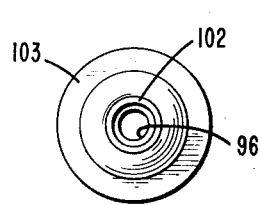
FIG. 12 is the left end elevation view of the pilot valve body of FIG. 11.
Figure 11:
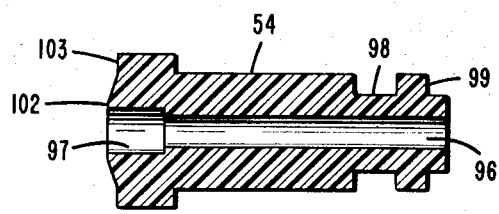
FIG. 11 is an enlarged cross section view of the pilot valve body shown in FIG. 1.
Figure 14:
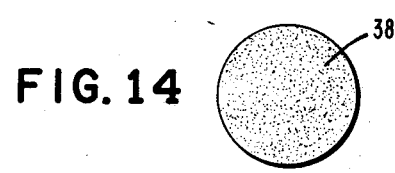
FIG. 14 is a plan view of the filter disclosed in FIG. 13.
Figure 13:
FIG. 13 is a side view of the filter shown in FIG. 1.

The pilot valve body 54 as shown in FIGS. 11 and 12 is constructed with a bore 96 which allows gas entering port 56 to flow through it. An annular channel 98 is cut into the valve body to hold O-ring 100 so that the O-ring 100 will form a gas-tight seal between the wall of chamber 44 and the outer surface of the valve body 54. The biasing spring 108 has one end seated in the blind end 104 of chamber 44 and the other end surrounding the pilot valve body at the spring rest 99 where it abuts against the pilot valve body to urge the pilot valve body away from the blind end of chamber 44 toward the spool mechanism. The other end of the pilot valve body which performs the sealing functions comprises a shoulder portion 103, the front surface of which has a flat surface to contact the flat surface of the inlet valve body contact area 60. Counterbore 41 in the pilot housing provides clearance for shoulder 103. The forward edge of the pilot valve body slopes upward from the flat surface of shoulder 103 to form an annular ring 102 which has a flat sealing surface surrounding the bore 97. Thus there is formed on the forward edge of the pilot valve body a geometric surface which does not have to hit the same point repeatedly and therefore never spreads the seal area. When the valve is closed, ring 102 abuts flat surface 68 on primary spool 62. Inlet gas pressure works on an area created by diameter of body 54 less diameter of bore 96 to hold the valve closed. The same pressure also works on the much smaller area of ring 102 less that of bore 96. The net effect is that the inlet gas pressure holds the valve closed providing that the bias of spring 25 is strong enough to prevent the gas pressure on diameter 54 from moving primary spool 62.

Adjacent the pilot valve chamber 44 is spool port 56 cut through the inlet valve body contact area 60. The spool port 56 allows the pressurzed gas passing though the pilot valve bore 96 to pass into the stepped spool chamber 58. A plurality of vents 47 are also cut through the inlet valve body contact area 60 substantially parallel to the spool port 56 and located approximately adjacent the flat forward surfaces of the pilot valve body shoulder 103. As the pilot valve body 54 moves forward its shoulders 103 hit the contact area 60 thus stopping the pilot body and keeping it in position until its return.

Figure 7:
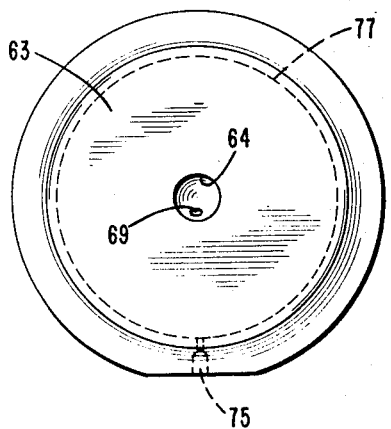
FIG. 7 is the left end elevation view of the primary spool body shown in FIG. 6.
Figure 6:
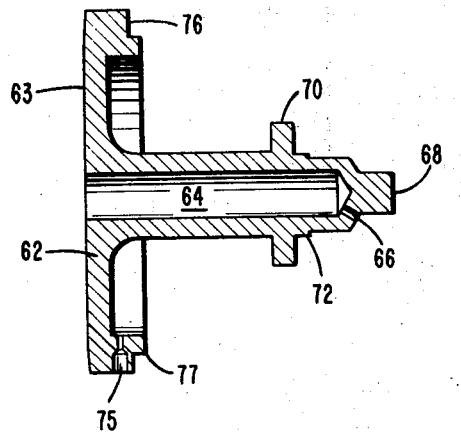
FIG. 6 is a cross section view of the primary spool body shown in FIG. 1.

Mounted in the inlet valve spool chamber 58 is a primary spool body 62 as shown in FIGS. 6 and 7 having a centrally positioned bore 64 connected to the spool chamber by a feed port 66. The feed port 66 serves to admit gas to the working surface of piston 26 from the pilot valve bore 96 against the piston head 26. The rearward end of primary spool body 62 forms a projecting tip 68 which is adapted to seat against the pilot valve body 54 forming a gas-tight seal and preventing gas from entering into spool chamber 58, except when the unit is actuated. The end of projecting tip 68 has a flat surface and a greater total area than the area of the pilot valve lip 102. In addition, sealing contact is always between flat surfaces, so that there can be random orientation contact without damaging the seal. The primary spool body 62 also defines an annular rib 70 having a shoulder 72 upon which is seated a free floating O-ring 74. The annular rib 70 preferably fits within bore 80 of the secondary spool body 79 to guide the primary spool body along the inner surface 81 of the secondary spool body. The other end of the primary spool body 62 defines a forward head 63 which is adapted to engage piston head 26. The outer circumference of the forward head terminates in an outer rib 76 forcing a shoulder 77 cut therein. An escape port 75 is cut through the outer rib 76 so that gases exhausted by the returning piston 26 escape through port 75 in the forward head 63 into chamber 83 formed by the primary spool body and secondary spool body in the spool chamber 58. The shoulder 77 is adapted to form a channel or seat in cooperation with the secondary spool to hold O-ring 78. The shoulder 77 in cooperation with the secondary spool body places the O-ring under compression so that the O-ring will expand toward the piston 26 thus ofrcing the primary spool body 62 forward when the compressive forces of the piston 26 on the forward head 63 of the primary spool body are lessened.

Figure 5:
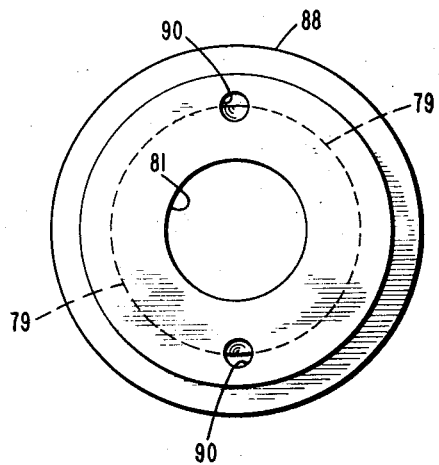
FIG. 5 is the left end elevation view of the secondary spool body of FIG. 4.
Figure 4:
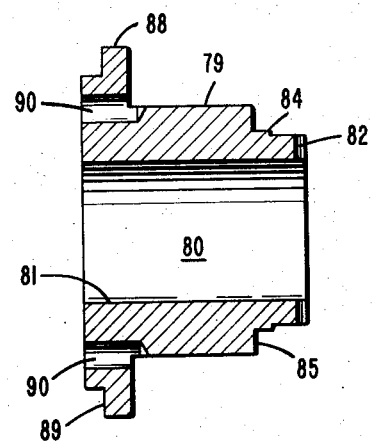
FIG. 4 is a cross section view of the secondary spool body shown in FIG. 1.

As shown in FIGS. 1, 4 and 5, a secondary spool body 79 having a bore 80 therethrough surrounds the annular rib 70 of the primary spool body 62 to form the O-ring seat for O-ring 74. The rear of the secondary spool body 79 has a plurality of radial slots 82 cut from the outer surface of the spool body 79 to the bore 80 so that when the rear end wall of the secondary spool body 79 engages the rear wall of body chamber section 59, the annulus 87 is in communication with bore 80. The outer surface of the spool body 79 is stepped outward from the end wall to define a shoulder 84 and a seat 85 which are adapted to seat and hold a free floating O-ring 86. The forward portion of the secondary spool body 79 takes the form of an annular ring 88. The ring 88 has an annular notch 89 cut into it to form the other part of the seat for O-ring 78, in cooperation with the abutting shoulder 77 of the primary spool body. It should be noted that the abutting shoulder 77 of the primary spool body does not form a level seat for O-ring 78 when it abuts notch 89. Exhaust channels 90 are provided through the ring 88 so that the exhaust gas caused by the return of the piston 26 can pass from exhaust area 87 through primary spool exhaust port 75 into chamber 83. From chamber 83 the gas passes through channels 90 into exit port 92 and the exhaust ring 94 of the inlet valve body. The gas is carried by the exhaust ring 94 to exhaust conduit 95 in the outer body 22 where the gases are vented to the atmosphere.

In the unit, a washer 116 is preferably placed under the head of the plug housing in contact the inlet valve body surrounding O-ring 118 to provide a suitable gas seal. In addition, inlet valve body O-rings 120 and 122 are placed in respective channels 124 and 126 of the inlet valve body so that the inlet gas is sealed between these O-rings.

The unit is maintained in its readiness condition by means of a coil spring 25 acting on the piston 26, which spring exerts a force greater than that developed by the spring 108, plus the gas pressure acting on the area of the diameter of the body 54. A trigger notch (not shown) is located in an output shaft 24 integral with the piston 26. Upon activation of a trigger 27 the output shaft 24 and its integral piston 26 move in the direction of arrow A. Then, under the force of spring 108 and that developed by the pressurized gas, the pilot valve body 54, the spool bodies 62, 79 and the piston 26 move in unison until the front face of the pilot valve body 54 abuts surface 60 of the inlet valve body 30.

The piston is pulled further forward by the trigger to allow the force of the gas pressure passing through bore 97 of the pilot valve body against the rearward surface of the primary spool 62 in combination with the resilient action of O-ring 78 against shoulder 77 moves the primary spool body 62 until the driving head 63 of the primary spool body abuts against the piston chamber walls 29 creating a seal therewith. The pilot valve body 54 cannot follow the primary spool body 62 because port 56 is smaller than the shoulder 103 of the pilot valve body. Thus, after projecting tip 102 of the pilot valve body 54 projects into port 56 the pilot valve body shoulders 103 strike the flat surface of the contact area 60 stopping movement of the pilot valve body. Pressurized gas pours through the bore 96 of the pilot valve body into the spool chamber 58 to seat O-ring 74 against shoulder 72, guide ring 70 and the inner surface 81 of the secondary spool body to form a gas-tight seal. As the primary spool body 62 is moved forward, gas continues to pass through orifice 66 in the primary spool body 62 into the lesser pressure of chamber 64 of the primary spool to drive piston 26 forward. At the same time that pressurized gas begins to enter the spool chamber 58 the gas travels through radial slots 82 of the secondary spool body causing the O-ring 86 to seat against the shoulder 84, end wall 85 and the inner surface of the spool chamber 58 to form a gas-tight seal. When the primary spool body 62 has traveled forward, the gas pressure pushes the secondary spool body forward until its forward edge contacts shoulder 77 of the primary spool body. The contact between the primary spool shoulder 77 and the secondary spool seats O-ring 78 in a state of compression so that it can act on the primary spool body when the piston 26 is removed from contact with the primary spool body.

When the piston chamber 59 is filled with gas, the pressure ratios become such that the spool mechanism is returned rearward to its initial position. As a greater area of pressure is formed on the face of the primary spool body on the piston side as opposed to the lesser area of pressure formed on the rear surfaces of the primary spool body and secondary spool body, the greater force pushes the primary spool body rearward carrying both spool bodies back until the flat end surface of the tip projection 68 is seated against the pilot spool body lip 102 to seal the pilot valve body bore 96 and close the valve. As the spool mechanism is returned, gas pressure acting on the diameter of the pilot valve body 54 serves along with spring 108 to absorb the effect of the tip projection 68 striking the lip 102. This cushioned action eliminates impact on lip 102 so that the surfaces will continue to form a gas-tight seal after repeated use.

Functionally, the pilot valve works fully well without spring 108. The purpose of spring 108 is to insure that the valve is in the closed position when initially pressurized. The force due to pressure acting on pilot valve body is several times greater than that of spring 108. For example, in the preferred embodiment the pressure force on the spring 108 is less than one pound with the pressure force acting on the pilot valve body being equal to five (5) to six (6) pounds.

A gas exhaust is provided in the apparatus as the pressurized gas returned by the returning piston head 26 acted on by spring 25, is forced into the annular channel 87 formed by the forward face of the primary spool and the inner casing 29, the inlet valve body 30 and O-ring 78. The O-ring 78 forms a gas-tight seal so that the gas passes from annular channel 87 through the primary spool body at port 75 into an annular chamber 83 formed by the primary spool body 62 and the secondary spool body 79. The gas exits from chamber 83 through passage 90 and port 92 into an annular exhaust ring or channel 94 which is connected to the atmosphere by exhaust channel 95. At this time, the apparatus is ready to begin a repeat cycle of operation.

While the preferred embodiment of the invention has been disclosed, it is understood that the invention is not limited to such an embodiment since it may be otherwise embodied in the scope of the appended claims.

What is claimed is:

1. A self-energizing pilot valve for a gas powered driving unit adapted to convert gas pressure into rectilinear motion comprising a main casing, an inlet valve body mounted in said casing; said inlet valve body defining an interconnected spool chamber and a valve chamber, spool means slidably mounted in said spool chamber and including a rearwardly projecting tip having a closed flat end surface, a pilot valve housing having a stepped end mounted in said valve chamber, said pilot valve housing defining a stepped blind bore pilot valve body chamber, and gas feed means leading to said pilot valve chamber, said gas feed means comprising a gas passageway defined by said pilot valve housing, a filter chamber defined by said pilot housing communicating with said passageway and a port defined by said pilot valve housing leading from said filter chamber to said pilot valve chamber, an O-ring mounted on said stepped end of said pilot valve housing, said O-ring being adapted to prevent the flow of gas past the forward face of said housing and to direct the flow of gas into said gas feed means, a pilot valve body slidably mounted in said pilot valve chamber and including a stop means to engage the step of said stepped blinde bore, said pilot valve body defining a throughgoing central bore to allow gas flowing from said pilot valve chamber to pass therethrough, said pilot valve body having a raised flat annular lip end means to seat against said flat end surface of said spool means to prevent the flow of gas through said central bore and an annular channel having an O-ring seated therein to prevent the flow of gas past the exterior of said pilot valve body and spring means mounted in said blind bore pilot valve chamber, said spring means being seated in one end of said blind bore pilot valve chamber and abutting an end of said pilot valve body.

2. A self-energizing pilot valve as claimed in claim 1, said flat annular lip end means comprising an extending shoulder having a flat outer surface and a raised inner portion terminating in a flat surfaced annular ring surrounding the central bore of said pilot valve body.

3. A self-energized pilot valve as claimed in claim 1 wherein said valve chamber is threaded and said pilot valve housing is threaded to allow said pilot valve housing to be adjustably mounted in said valve chamber.

4. A self-energized pilot valve as claimed in claim 3 wherein one end of said pilot valve housing is provided with torque receiving means.

* * * * *